_US005790609A_

United States Patent [19]
Swoboda

[11] Patent Number: 5,790,609
[45] Date of Patent: Aug. 4, 1998

[54] APPARATUS FOR CLEANLY SWITCHING BETWEEN VARIOUS CLOCK SOURCES IN A DATA PROCESSING SYSTEM

[75] Inventor: Gary L. Swoboda, Sugarland, Tex.

[73] Assignee: Texas Instruments Incorporated, Dallas, Tex.

[21] Appl. No.: 743,019

[22] Filed: Nov. 4, 1996

[51] Int. Cl.$^6$ .................................................. G06F 1/04
[52] U.S. Cl. ........................... 375/357; 395/556; 375/371
[58] Field of Search ............................. 375/354, 357, 375/376, 371; 327/291, 292, 293, 294, 298; 395/555, 556, 559, 560

[56] References Cited

U.S. PATENT DOCUMENTS

| | | | |
|---|---|---|---|
| 3,453,601 | 7/1969 | Bogert et al. . | |
| 3,623,017 | 11/1971 | Lowell et al. | 340/172.5 |
| 3,868,647 | 2/1975 | Zandveld | 340/172.5 |
| 4,217,637 | 8/1980 | Faulkner et al. | 364/200 |
| 4,267,577 | 5/1981 | Hashimoto et al. | 364/707 |
| 4,279,020 | 7/1981 | Christian et al. | 364/900 |
| 4,293,927 | 10/1981 | Hoshii | 364/900 |
| 4,381,552 | 4/1983 | Nocilini et al. | 364/900 |
| 4,409,665 | 10/1983 | Tubbs | 364/707 |
| 4,590,553 | 5/1986 | Noda | 364/200 |
| 4,698,748 | 10/1987 | Juzswik et al. | 364/200 |
| 4,814,591 | 3/1989 | Nara et al. | 235/380 |
| 4,819,164 | 4/1989 | Branson | 364/200 |
| 4,821,229 | 4/1989 | Jauregui | 364/900 |
| 4,851,987 | 7/1989 | Day | 364/200 |
| 4,980,836 | 12/1990 | Carter et al. | 364/483 |
| 5,167,024 | 11/1992 | Smith et al. | 395/375 |
| 5,218,704 | 6/1993 | Watts, Jr. et al. | 395/750 |
| 5,274,678 | 12/1993 | Ferolito et al. | 375/357 |
| 5,357,146 | 10/1994 | Heimann | 327/292 |
| 5,485,127 | 1/1996 | Bertoluzzi et al. | 331/69 |
| 5,517,638 | 5/1996 | Szczepanek | 395/550 |
| 5,604,452 | 2/1997 | Huang | 327/99 |
| 5,675,615 | 10/1997 | Watt | 375/354 |

FOREIGN PATENT DOCUMENTS

| | | |
|---|---|---|
| 0 349 726 | 5/1989 | European Pat. Off. . |
| 0 363 567 A2 | 8/1989 | European Pat. Off. . |

*Primary Examiner*—Don N. Vo
*Assistant Examiner*—Amanda T. Le
*Attorney, Agent, or Firm*—Gerald E. Laws; James C. Kesterson; Richard L. Donaldson

[57] ABSTRACT

A clock acquisition subsystem for a data processing system has an interlocked clock multiplexer 100 for acquiring a clock source which is provided as clock signal 102 to the data processing system. Multiplexer 100 has at least two inputs 104 and 106 for clock source signals. Each clock source signal can be connected to one or more clock sources 110 and 120. Control register 130 specifies which clock source is to be selected by the multiplexer. The multiplexer has an interlocked synchronizer on each clock signal input so that when the multiplexer is switched, output clock signal 102 transitions cleanly from a first clock source to a second clock source without glitches or runt pulses.

14 Claims, 7 Drawing Sheets

# 5,790,609

APPARATUS FOR CLEANLY SWITCHING BETWEEN VARIOUS CLOCK SOURCES IN A DATA PROCESSING SYSTEM

FIELD OF THE INVENTION

This invention relates to real-time power conservation in a computer, and more particularly to an apparatus and method for switching among various clock source while the computer is in operation or when going into or out of a low power mode of operation.

BACKGROUND OF THE INVENTION

Data processing systems are used in myriad applications which touch virtually every aspect of life. In applications where the data processing system uses battery power for any substantial length of time, it is particularly desirable to be able to minimize the power consumption of the data processing system. Examples of systems wherein battery power is used for substantial periods of time include portable data processing systems such as notebook and sub-notebook computer systems, and data processing systems which are employed in remote locations, hazardous weather areas, or earthquake prone areas.

In applications which require high performance from a data processing system, the high performance requirement often presents a heat dissipation problem. As a result, most high performance data processing devices use expensive packages such as ceramic pin grid arrays in order to provide heat dissipation capabilities adequate to avoid overheating the data processing device.

In addressing the power management issues presented by the above-described circumstances, it is known that the power dissipation of a data processing system having a fixed operating voltage is given by the following equation:

$$P = CV^2 f,$$

where P is the power dissipated, C is the effective power dissipation capacitance, V is the operating voltage and f is the effective transition frequency. Thus, the dissipated power P can be reduced by reducing the effective transition frequency f.

In one known approach to reducing the effective transition frequency f, a data processing device can divide down its own clock frequency in response to an external stimulus. For example, one known conventional RISC microprocessor has a reduced power mode of operation wherein it responds to an external stimulus to reduce its internal clock frequency by 75%.

Prior clock switching circuits generally operate by dividing the frequency of a master oscillator so that synchronous operation is maintained, or by stopping the processor prior to switching between asynchronous clock sources. Other switching circuits rely on switching between a high frequency clock and a low frequency clock in order to mask "glitches" produced when the high frequency clock is switched asynchronously.

Accordingly, it is an object of the invention to provide a clock switching circuit for switching between asynchronous clock sources while the processor remains in operation.

Another object of the invention is to provide clean, "glitchless" switching between asynchronous clock sources which have frequencies which may be relatively close to each other.

Other objects and advantages will be apparent to those of ordinary skill in the art having reference to the following figures and specification.

SUMMARY OF THE INVENTION

In accordance with the present invention, an electronic data processing system is provided with a clock acquisition system for providing an output clock which is selectable from a plurality of clock sources. The clock acquisition system has a selection means for specifying a selected clock source from a plurality of clock sources. Furthermore, the clock acquisition system has an interlocked clock multiplexer which is responsive to the selection means to select one of the clock sources. The interlocked clock multiplexer is operational to insert a wait state of a predetermined logic value after "breaking" the previously selected clock source and before "making" the subsequently selected clock source while the operation of the clock multiplexer is synchronized to the subsequently selected clock source.

BRIEF DESCRIPTION OF THE DRAWINGS

Other features and advantages of the present invention will become apparent by reference to the following detailed description when considered in conjunction with the accompanying drawings, in which.

Corresponding numerals and symbols in the different figures and tables refer to corresponding parts unless otherwise indicated.

DETAILED DESCRIPTION OF PREFERRED EMBODIMENTS OF THE INVENTION

Today's data processing systems generally comprise one or more microprocessors, peripheral devices for sending and receiving data, and various types of memory subsystems. As semiconductor integration technology improves, many, if not all of the components of a data processing system can be located on a single integrated circuit (IC). Such data processing system can have multiple clock sources which are provided to a clock acquisition subsystem which selects which of the clock sources will be used by the data processing system at any given time. These clock sources may have different clock characteristics such as frequencies, duty cycles, etc. Specifying the clock source is traditionally accomplished using device pins, but as the complexity and density of ICs has increased, this approach is less desirable. An alternative to this approach provides control of the clock selection by means of software (SW) controlled circuits.

The SW control of the clock source selection allows the clock generation to be switched between multiple clock sources at any time without an initialization sequence being required (RESET, etc.). This allows different clock sources to be selected at various times so that the operation of the various components of the data processing system can be optimized. The SW method allows many different clock sources to be SW selected. This is accomplished by providing a synchronous break before make clock switching mechanism (referred to as an "interlocked clock multiplexer" (ICM)) which responds to a clock control register value. The clock control register is generally initialized by system reset and is writable by SW.

Figure 1:
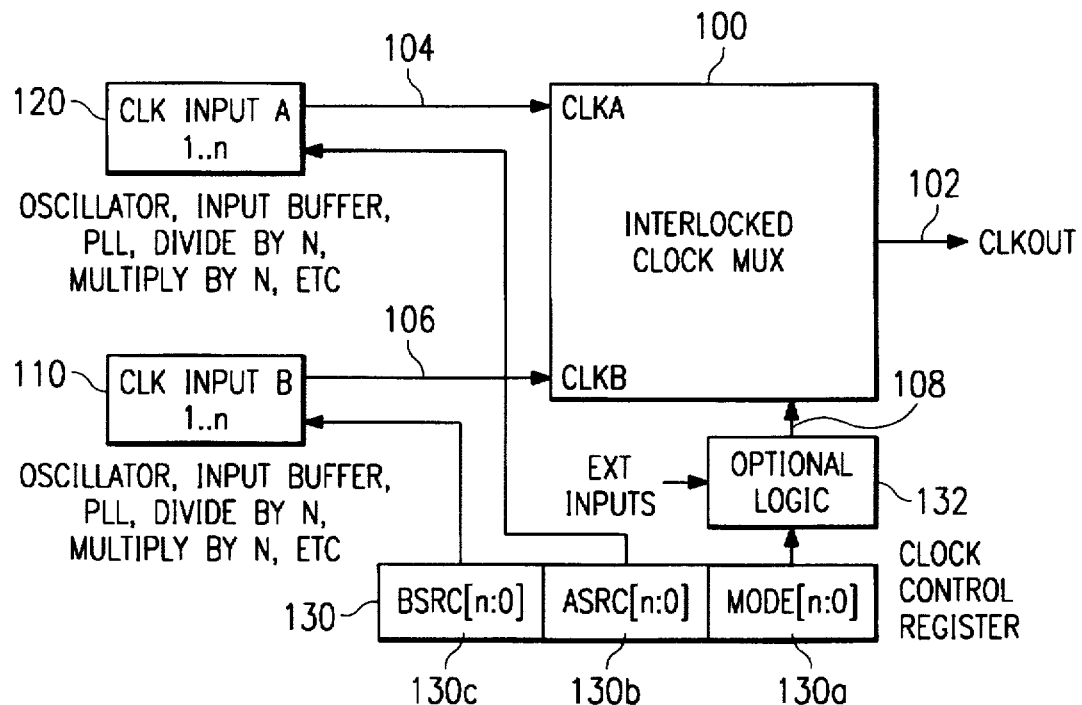
FIG. 1 is a block diagram of clock acquisition system with a double throw switch for switching between two asynchronous clock sources, which uses an interlocked clock multiplexer according to the present invention, where each clock source may also be a plurality of clock sources.

A system level block diagram of such a system is shown in FIG. 1. In this system, one of two clock sources: clock-A source 120 which is connected to a CLKA input terminal on ICM 100 and clock-B source 110 which is connected to a CLKB input terminal on ICM 100, is selected to be the system clock source 102 using an interlocked break before make clock multiplexer 100 controlled by a SW writable clock control register 130. Clock sources 120 and 110 may be a single source or multiple sources which could be but are not limited to oscillators, external inputs, PLL, multiply by N (N is a positive real number), divide by N (N is a positive real number), etc.

Clock control register 130 contains single or multiple mode bit field 130a which can be modified by external logic 132 if necessary. The resultant is a SEL_A signal 108 which selects clock A signal 104 or clock B signal 106. Either clock source 120 or 110 maybe composed of more than one clock source, in which case control register 130 contains a bit field to identify the specific clock source. Clock A Source field 130b is used to identify the specific clock source which creates Clock A signal 104. Clock B Source field 130c is used to identify the specific clock source which creates Clock B signal 106. Although not mandatory, it may be desirable for the control register mode bits 130a to be set to a known state by the system initialization function. It may also be desirable for the specific ASRC[n:0] field 130b or BSRC[n:0] field 130c corresponding to the initialized value of mode bits 130a to be initialized. The initialization of these bits can be synchronous or asynchronous. This would completely define the clock source at system initialization. During normal system operation, software is allowed to change mode bit field 130a at anytime and thereby select a clock source which has different clock characteristics. ASRC[n:0] bits 130b should only be changed while Clock B signal 106 is been selected and BSRC[n:0] bits 130c should only be changed while Clock A signal 104 is selected.

Figure 2:
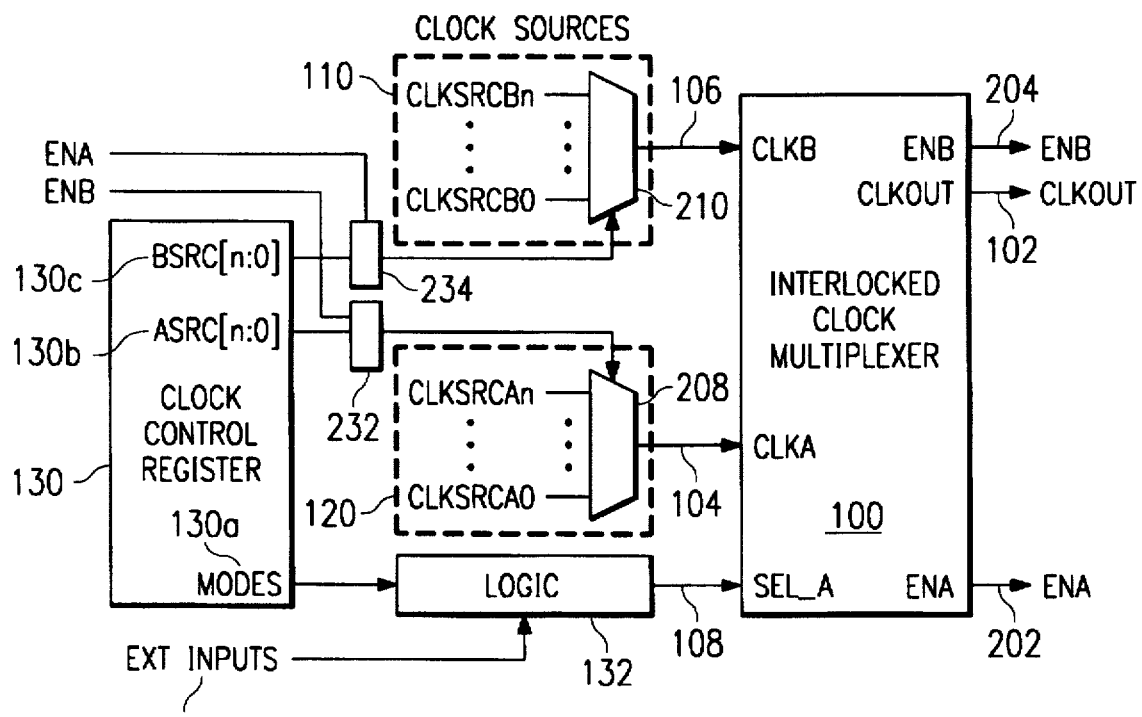
FIG. 2 illustrates one way of selecting among several clock sources to be provided to each input of the interlocked clock multiplexer of FIG. 1.

A more detailed system level diagram of a software selectable clock acquisition subsystem is shown in FIG. 2. This figure shows the two clock source signals, Clock A signal 104 and Clock B signal 106 being generated as outputs of multiplexers 208 and 210 respectively, with controls BSRC[n:0] 130c and ASRC[n:0] 130a. The ASRC [n:0] and/or BSRC[n:0] multiplexer control fields 130b–c can be written by software anytime when an optional hardware interlock 232 or 234 is used to prevent a new value from being applied to the multiplexer until the opposite clock source is selected. Enable A (ENA) signal 202 indicates when Clock A 104 is selected and Enable B signal 204 indicates when Clock B 106 is selected. These restrictions assure that clock-A source 120 and clock-B source 110 are changed only when they are not being used to acquire CLKOUT signal 102, thus assuring system clock integrity. In the absence of hardware interlocks 232 or 234, the controlling software must assure that the opposite clock source is selected for CLKOUT when the multiplexer select fields 130b–c are changed.

Figure 3:
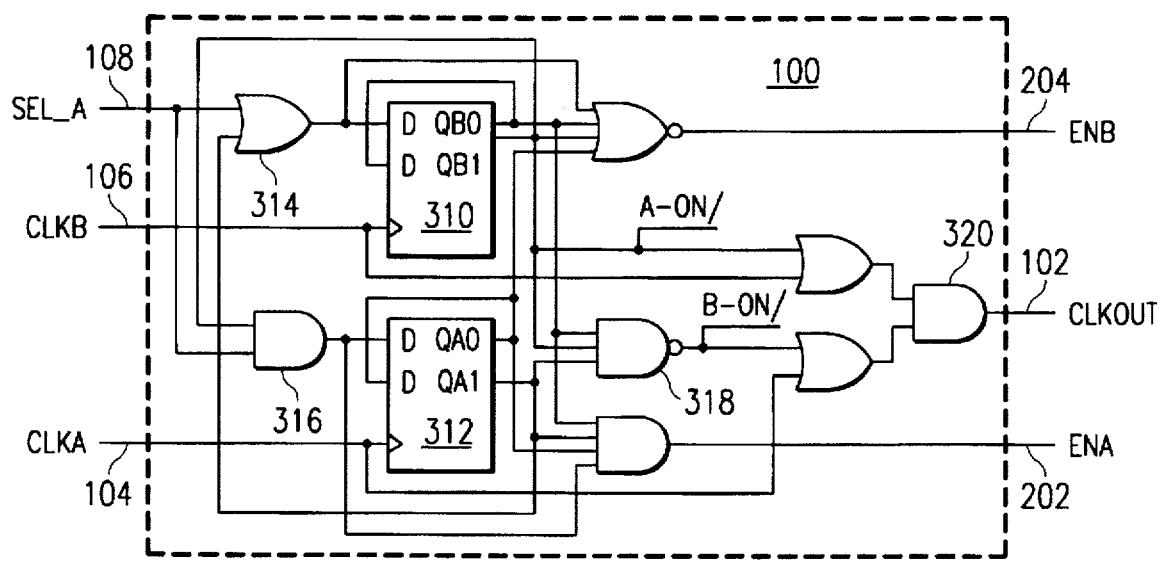
FIG. 3 is a circuit diagram of the double throw interlocked clock multiplexer of FIG. 1.

FIG. 3 is a circuit diagram of the double throw interlocked clock multiplexer of FIG. 1. ICM 100 switches between two clock source signals 104 and 106 in response to select signal 108 to acquire a clean, glitch free output clock signal 102 which has selected clock characteristics. This circuit, for convenience, is shown with a two stage synchronizer 310 and 312, but any number of synchronization stages can be utilized as needed to reduce the possibility of metastability on the outputs of synchronizers 310 and 312. Gates 314 and 316 provide an interlock function so that each time a new clock source is selected, a break before make sequence occurs, according to the present invention. In this particular implementation, the CLKB path is dominant. If either of the two flip-flops ($Q_{B0}$, $Q_{B1}$) enabling the selection of CLKB are low, the selection of CLKA is disabled by gate 318 irrespective of the state of the two flip-flops ($Q_{A0}$, $Q_{A1}$) which control the selection of CLKA. However, other forms of interlock schemes may be used.

An aspect of the present invention is that when SEL_A signal 108 is changed, this change will first be synchronized by CLKA synchronizer 310 or CLKB synchronizer 312 of the previously selected clock source in order to assure that CLKOUT signal 102 transitions to a wait state, or is "broken," cleanly at the end of a clock period of the previously selected clock source. Selector gate 320 is responsive to the outputs of each synchronizer 310 and 312 to select a clock source 104 or 106 according to which synchronizer is asserted. If neither synchronizer is asserted, then selector gate 320 outputs a steady logic signal that serves as a "wait state" between clock acquisition. Once a wait state has been established on CLKOUT signal 102, then the newly selected clock source selection is synchronized by the other synchronizer 310 or 312, respectively. This assures that after the wait state period which corresponds to the synchronization time of the newly selected clock source, CLKOUT signal 102 will begin toggling with the newly acquired clock signal in a clean, glitch-free manner.

Figure 4:
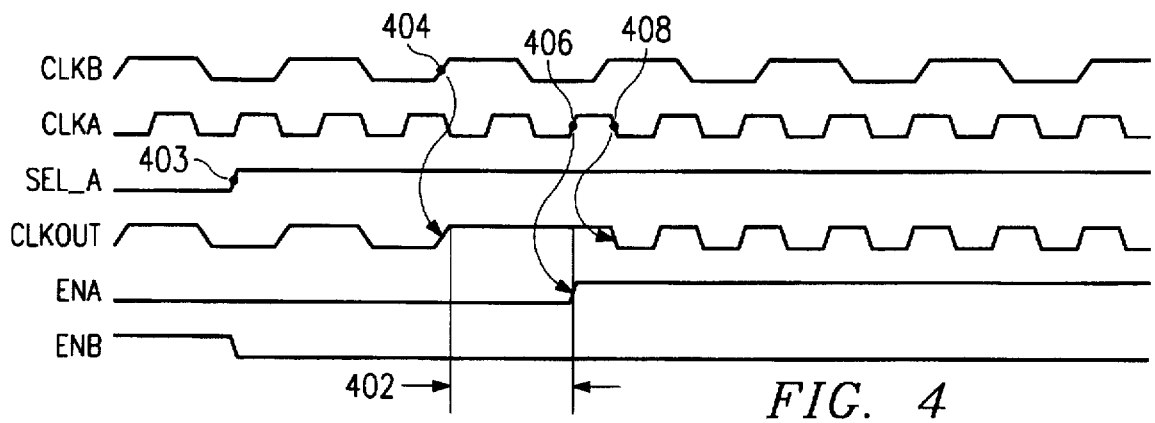
FIGS. 4 and 5 are timing diagrams which illustrate the operation of the interlocked clock multiplexer of FIG. 1, according to the present invention.
Figure 5:
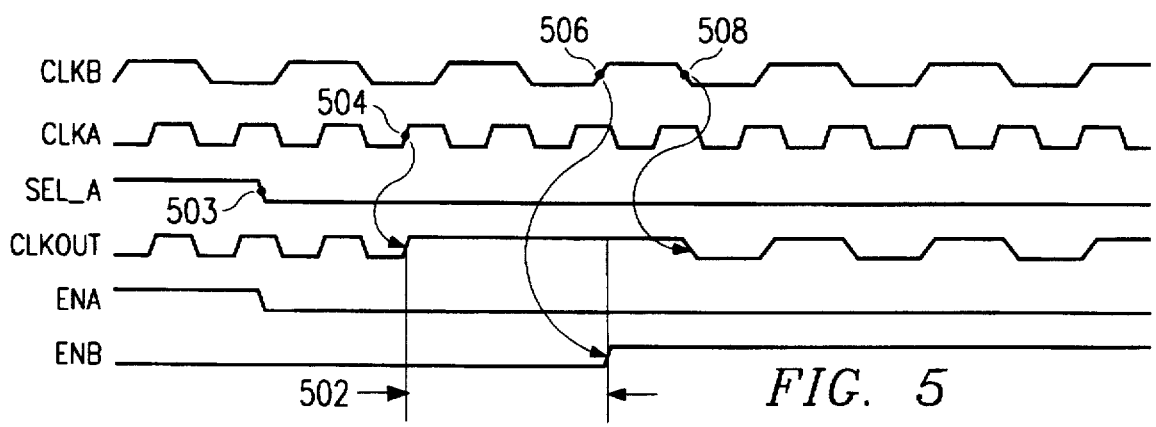

FIGS. 4 and 5 are timing diagrams which illustrate the operation of the interlocked clock multiplexer of FIG. 1, according to the present invention. Assuming that CLKA signal 104 and CLKB signal 106 are both toggling, the switch from CLKB to CLKA and CLKA to CLKB generated by changing SEL_A is shown in FIG. 4 and FIG. 5, respectively. In FIG. 4, SEL_A changes at time 403, which may be asynchronous to both CLKA and CLKB. This change is transferred via gate 314 to the input of synchronizer 310 where the change in logic level of SEL_A is synchronized to CLKB. After two clock edges of CLKB, output $Q_{b1}$, is de-asserted at time 404. This causes gate 320 to stop outputting CLKB while CLKOUT is in a high logic state, and to maintain a high logic wait state during wait state time period 402 which extends from time 404 to time 406. Also during wait state period 402, interlock gate 316 is enabled to provide SEL_A signal to synchronizer 312, where the change in level of SEL_A is synchronized to CLKA. After two clock edges of CLKA, output $Q_{a1}$ is asserted at time 406. Selector gate 320 is now enabled to output CLKA while CLKA is in a high logic state, so that CLKOUT transitions smoothly from wait state 402 to a first output transition in response to CLKA at time 408. Thus, according to the present invention, ICM 100 first "breaks" CLKB cleanly, then "makes" CLKA cleanly with no possibility of glitches, runt pulses, or partial clock pulses.

In FIG. 5, SEL_A changes at time 503, which may be asynchronous to both CLKA and CLKB. This change is transferred via gate 316 to the input of synchronizer 312 where the change in logic level of SEL_A is synchronized to CLKA. After two clock edges of CLKA, output $Q_{a1}$ is de-asserted at time 504. This causes gate 320 to stop outputting CLKA while CLKOUT is in a high logic state, and to maintain a high logic wait state during wait state time period 502 which extends from time 504 to time 506. Also during wait state period 502, interlock gate 314 is enabled to provide SEL_A signal to synchronizer 310, where the change in level of SEL_A is synchronized to CLKB. After two clock edges of CLKB, output $Q_{b1}$ is asserted at time 506. Selector gate 320 is now enabled to output CLKB while CLKB is in a high logic state, so that CLKOUT transitions smoothly from wait state 502 to a first output transition in response to CLKB at time 508. Thus, according to the present invention, ICM 100 first "breaks" CLKA cleanly, then "makes" CLKB cleanly with no possibility of glitches, runt pulses, or partial clock pulses.

Wait state 402 is less than approximately two cycles of CLKA and wait state 502 is less than approximately two cycles of CLKB. The maximum time to synchronize is two clock cycles since synchronizers 310 and 312 are two stage synchronizers. Additional stages may be added to either synchronizer in order to further reduce the possibility of a metastable condition being produced on the output of the synchronizer. This would increase the maximum time to synchronize and therefore the length of wait state 402 and/or wait state 502 accordingly. It is unlikely that more than ten stages would be needed to eliminate any chance of metastability.

Figure 6:
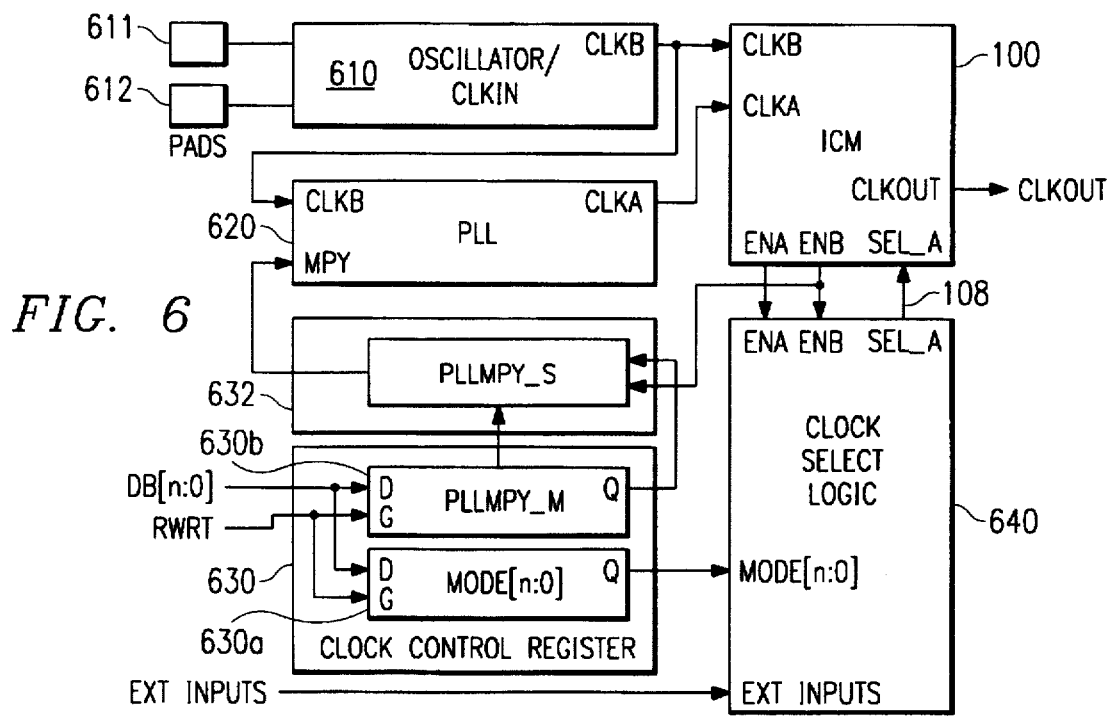
FIG. 6 is a block diagram illustrating the use of a programmable phase locked loop and an oscillator as clock sources for the switch of FIG. 1.

FIG. 6 is a block diagram illustrating the use of a programmable phase locked loop and an oscillator as clock sources for the switch of FIG. 1. PLL 600 has a programmable multiply ratio. Control register 630 is similar to control register 130, except field 630b holds a multiply ratio rather than a multiplexer select value. Control register 630 is written from a data bus, and an optional secondary latch 632 controls the application of the value of the control register value 630b to PLL 620. The secondary latch is updated with the primary value only when the oscillator has been selected as the system clock source, as was discussed earlier for hardware interlock 132. This prevents a programming error from creating a system clock disturbance.

Terminals 611–612 are typically used to connect a crystal to oscillator 610. The system is designed so that changes to the MODE[n:0] bits 630a do not cause glitches at the SEL_A output of the Clock Select Logic 640.

Figure 7:
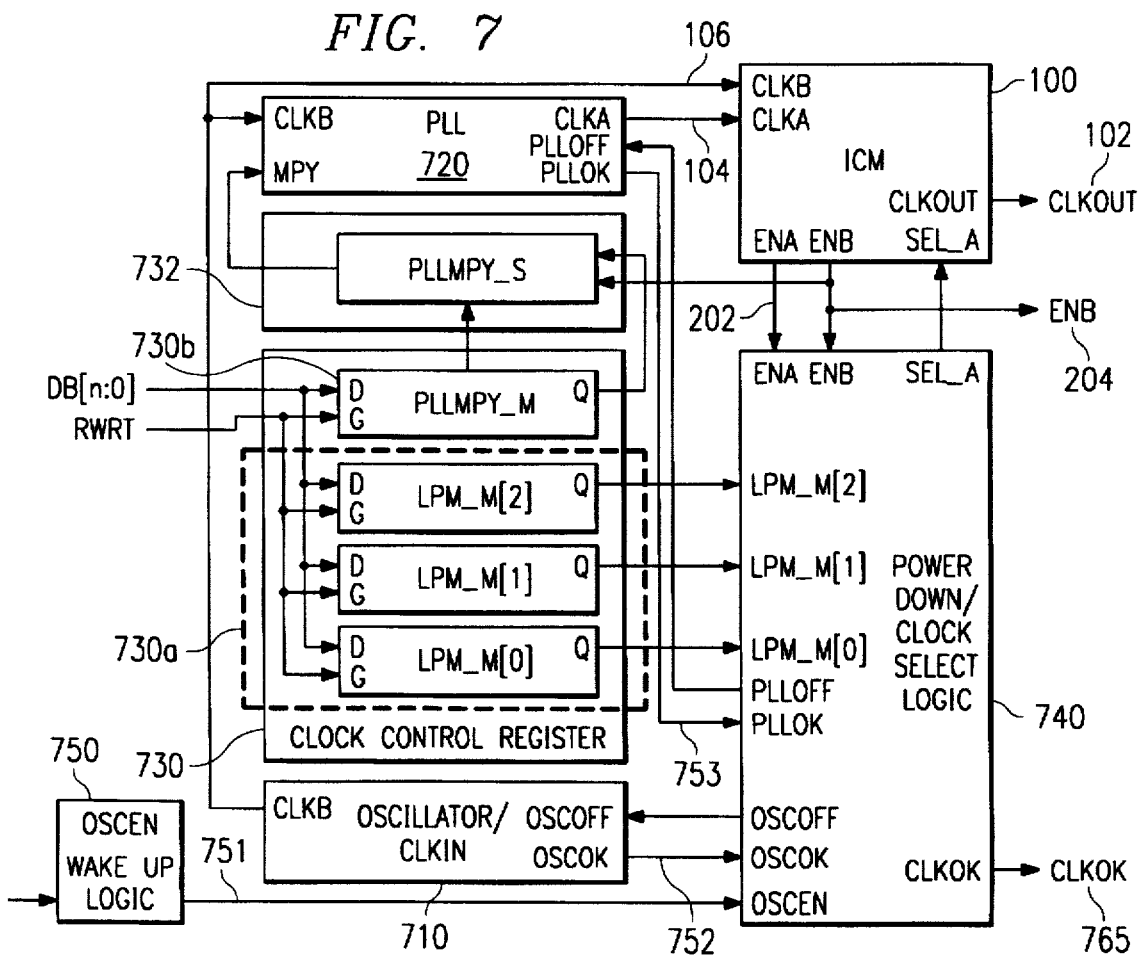
FIG. 7 is a block diagram of a clock acquisition system similar to FIG. 1, with a control register to control low power modes with hardware controlled deep sleep wakeup.

A further aspect of the present invention is illustrated in FIG. 7, which is a block diagram of a clock acquisition system similar to FIG. 1, with a control register to control low power modes with hardware controlled deep sleep wakeup. Today's data processing systems can have very low power modes. When devices are powered down, most if not all clocks are turned off within the system clock acquisition subsystem. Generally the power down modes are invoked by software sequences executed within the microprocessor or micro controller devices within these systems. Clock sources include crystal oscillators or phase locked loops (PLLs) which have substantial startup times. These start up times extend the interrupt latency when a device "wakes up" from a deep sleep low power mode. When a reference frequency, such as an oscillator, is supplied to the PLL in a system, it may be desirable to configure the system so that it initially wakes up and runs off the PLL reference while the PLL locks to the reference, provided this reference meets the system timing requirements. According to the present invention, this is possible when an interlocked clock multiplexer clock switch mechanism is included in the system. An ICM provides the ability to switch to the PLL reference prior to deep sleep or immediately after wakeup from a deep sleep, even when the reference clock and the PLL output have similar frequencies.

FIG. 7 represents a system level block diagram of a system featuring a capability to automatically select oscillator 710 as the clock source prior to operation after wakeup from deep sleep with circuitry to restart and automatically select PLL 720 as the system clock source after wakeup when PLL 710 has stabilized. ICM 100 acquires a CLKOUT signal 102 from either of clock source signals 104 or 106 in response to SEL_A signal 108 which is generated by clock selection logic 740. As discussed with reference to FIG. 2 and 3, clock A signal 104 and clock B signal 106 are not limited to single sources.

For the implementation shown in FIG. 7, the clock selection and power down modes are specified with a three bit (LPM_M[2:0]) low power mode selection code field 730a in clock control register 730. In this implementation, the three bit code is used as outlined in Table 1. Wakeup logic 750 generates an oscillator enable signal 751 in response to various wakeup events which is connected to clock selection logic 740.

TABLE 1

HW Clock Control For Deep Sleep Wake Up Definition

| LPM_M[2:0] | Description |
|---|---|
| 000 | Osc. on, PLL off, Osc. is Clock Source, No Power down |
| 001 | Osc. on, PLL off, Osc. is Clock Source, Osc. off when OSCEN == FALSE |
| 010 | Osc. on, PLL on, PLL is Clock Source, No Power down |
| 011 | Osc. on, PLL on, PLL is Clock Source, Osc. & PLL off when OSCEN == FALSE |
| 10x | Osc. on, PLL on, PLL is Clock Source; When OSCEN == FALSE then switch clock source from PLL to Osc. and turn PLL off and Osc. on; When OSCEN returns TRUE then switch clock source from Osc. to PLL after PLL has stabilized. |
| 110 | Osc. on, PLL on, PLL is Clock Source; When OSCEN == FALSE then switch clock source from PLL to Osc., PLL and Osc. remain on; When OSCEN returns TRUE then switch clock source from Osc. to PLL |
| 111 | Osc. on, PLL on, PLL is Clock Source; When OSCEN == FALSE then switch clock source from PLL to Osc., and turn PLL and Osc. Off; When OSCEN returns TRUE then switch clock source to Osc. until PLL has stabilized and then switch clock source to PLL |

Figure 8:
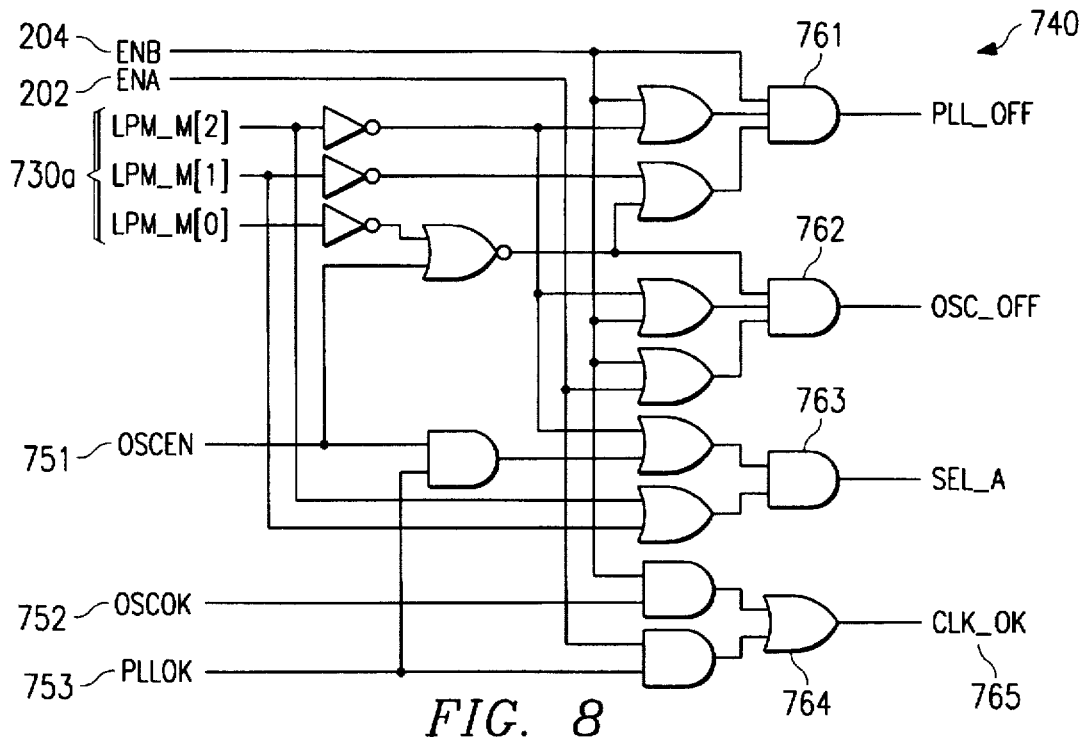
FIG. 8 is a circuit diagram of the power down selection logic of FIG. 7, with hardware control for re-enabling the phase locked loop.

FIG. 8 is a circuit diagram of power down selection logic 740 of FIG. 7, with hardware control for re-enabling the phase locked loop. Oscillator OK signal 752 is produced by oscillator 710 when the oscillator is operational. PLL OK signal 753 is produced by PLL 720 when the PLL is locked in to a reference signal and is operational. Gates 761–764 form control signals PLL_OFF, OSC_OFF, and SEL_A in order to produce the clock selection sequences contained in Table 1. CLK_OK signal 765 is asserted when the selected clock source is operational.

Figure 9:
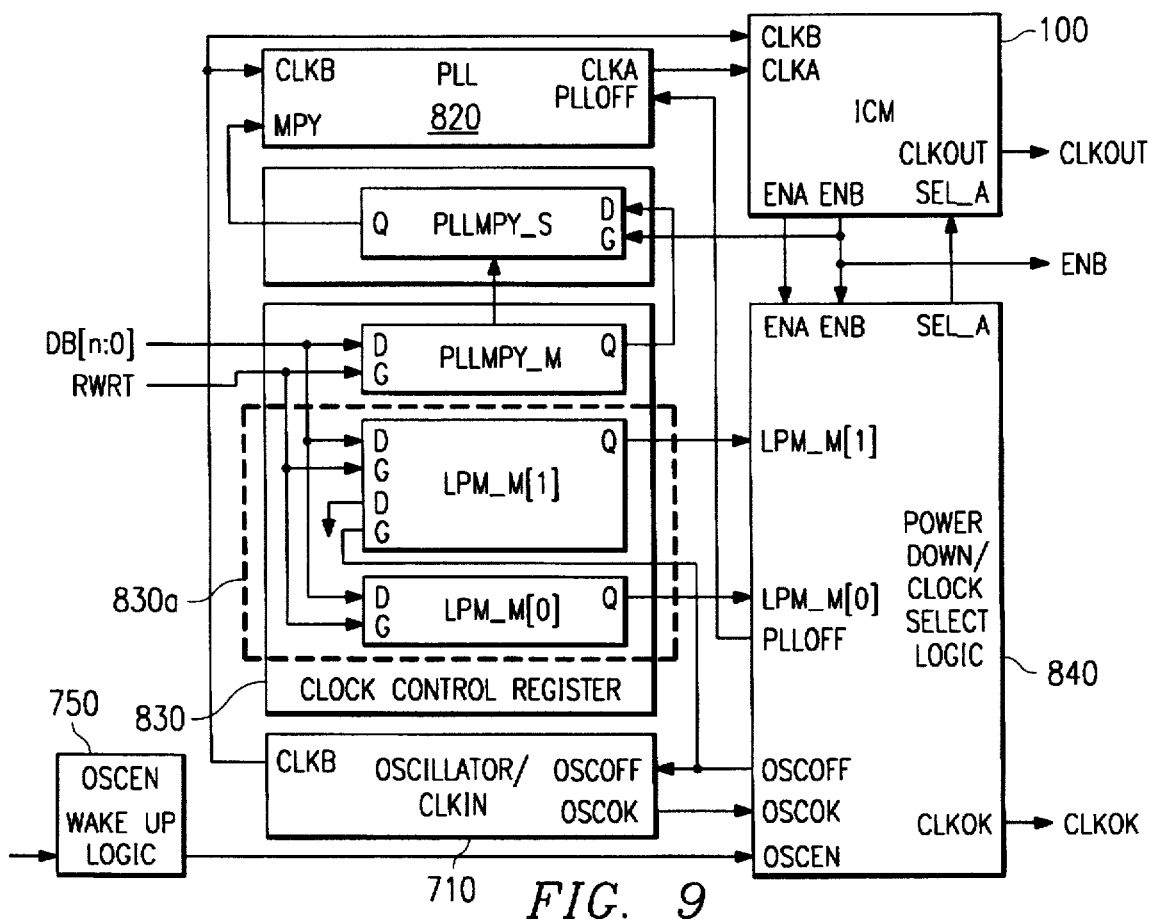
FIG. 9 is a block diagram of a clock acquisition system similar to FIG. 7, with a control register to control low power modes, with software controlled deep sleep wakeup.

FIG. 9 is a block diagram of a clock acquisition system similar to FIG. 7, with a control register to control low power modes, with software controlled deep sleep wakeup. This embodiment of the present invention is a system featuring an automatic switch from PLL 820 to oscillator 710 as the clock source for use after wakeup from deep sleep and software directed selection of PLL 820 as the system clock source after wakeup when PLL 820 has stabilized. This system is similar to that shown in FIG. 7 but does not support as many power down modes. Additionally, the hardware circuitry establishes the oscillator as the system clock source during a deep sleep powerdown in response to OSCOFF signal 862 being asserted.

It is up the software to reestablish PLL 820 as the system clock source after a deep sleep wakeup. In this implementation, the entry into a deep sleep powerdown modifies the value in the clock control register 830 in response to OSCOFF signal 862 being asserted. This implementation allows a microprocessor or microcontroller in a system to implement a timer function to determine when the output from PLL 820 should have stabilized, deleting the need to implement this function as hardware.

For the implementation shown in FIG. 9, the clock selection and powerdown modes are specified with a two bit (LPM_M[1:0]) low power mode selection code in clock control register 830. In this implementation, the two bit code is used as outlined in Table 2.

TABLE 2

HW Clock Control For Deep Sleep Wake Up Definition

| LPM_M[1:0] | Description |
| --- | --- |
| 00 | Osc. on, PLL off, Osc. is Clock Source, No Powerdown |
| 01 | Osc. on, PLL off, Osc. is Clock Source, Osc. off when OSCEN = FALSE |
| 10 | Osc. on, PLL on, PLL is Clock Source, No Powerdown |
| 11 | Osc. on, PLL on, PLL is Clock Source, when OSCEN = FALSE, then switch to Osc. as clock source and turn Osc. & PLL off and set LPM_M[1:0] code from 11 to 01. |

Figure 10:
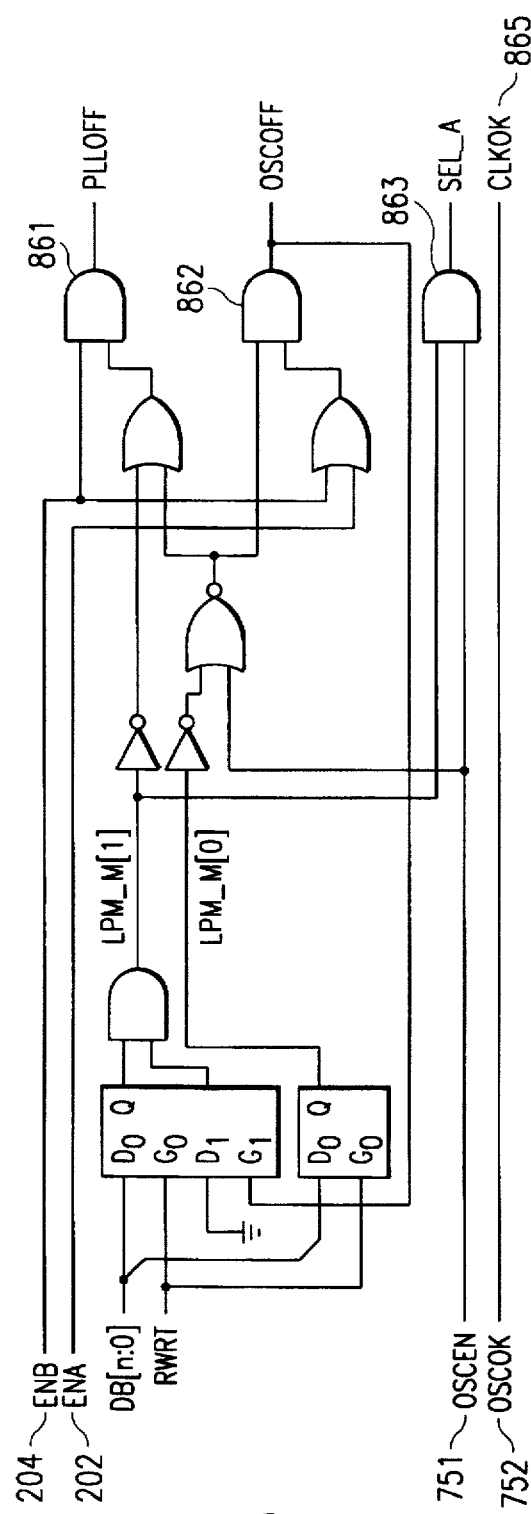
FIG. 10 is a circuit diagram of the power down selection logic of FIG. 9, with software control for re-enabling the phase locked loop.

FIG. 10 is a circuit diagram of the power down selection logic of FIG. 9, with software control for re-enabling the phase locked loop. Oscillator OK signal 752 is produced by oscillator 710 when the oscillator is operational. Gates 1–863 form control signals PLLOFF, OSCOFF, and SEL_A in order to produce the clock selection sequences contained in Table 2. CLKOK signal 865 is asserted when oscillator 710 is operational.

Figure 11:
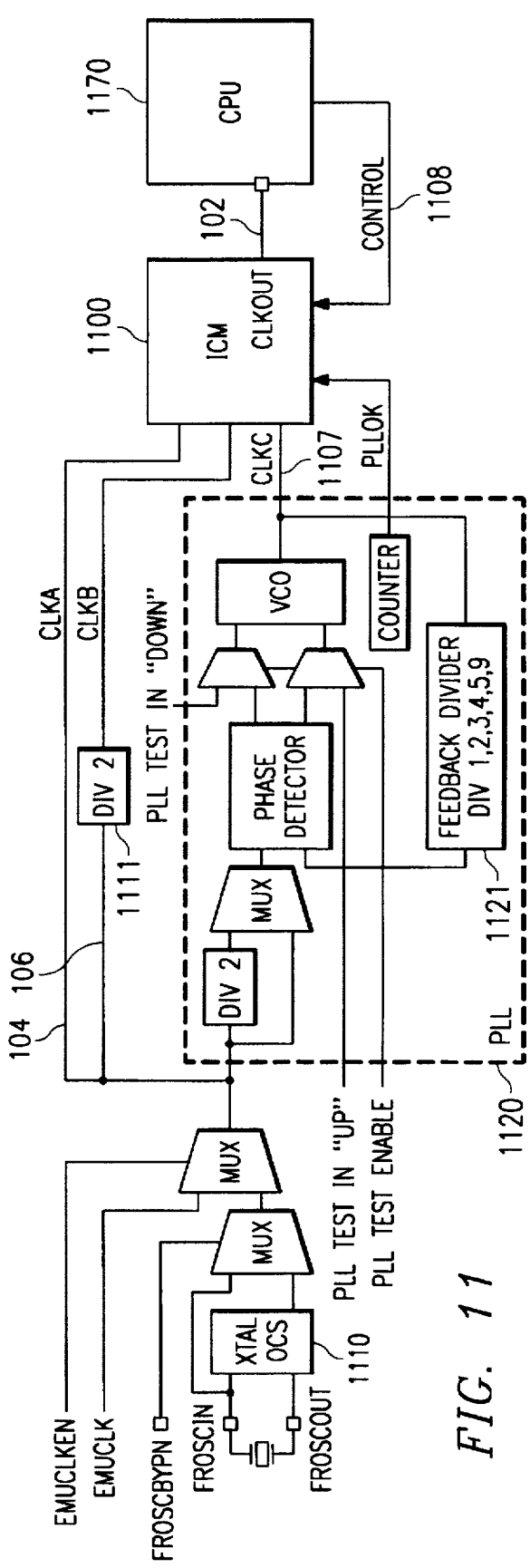
FIG. 11 is a block diagram of a clock acquisition system using a triple throw interlocked clock multiplexer, constructed according to the present invention, connected to a processor.

Another embodiment of a clock acquisition subsystem constructed according to the present invention is illustrated in FIG. 11, which is a block diagram of a clock acquisition system using a triple throw interlocked clock multiplexer. Oscillator 1110 generates CLKA signal 104, while divider 1111 divides the frequency of CLKA by two and forms CLKB signal 106. PLL is locked to oscillator 1110 and forms CLKC signal 1107, which has a frequency which differs from CLKA by a factor of 1, 2, 3, 4, 5, or 9 as determined by divider 1121. Thus, three clock sources which have different clock characteristics of frequency and possibly duty cycle are presented to ICM 1100. ICM 1100 acquires a CLKOUT signal 102 which is provided to microprocessor 1170 in response to control signals 1108.

Figure 12:
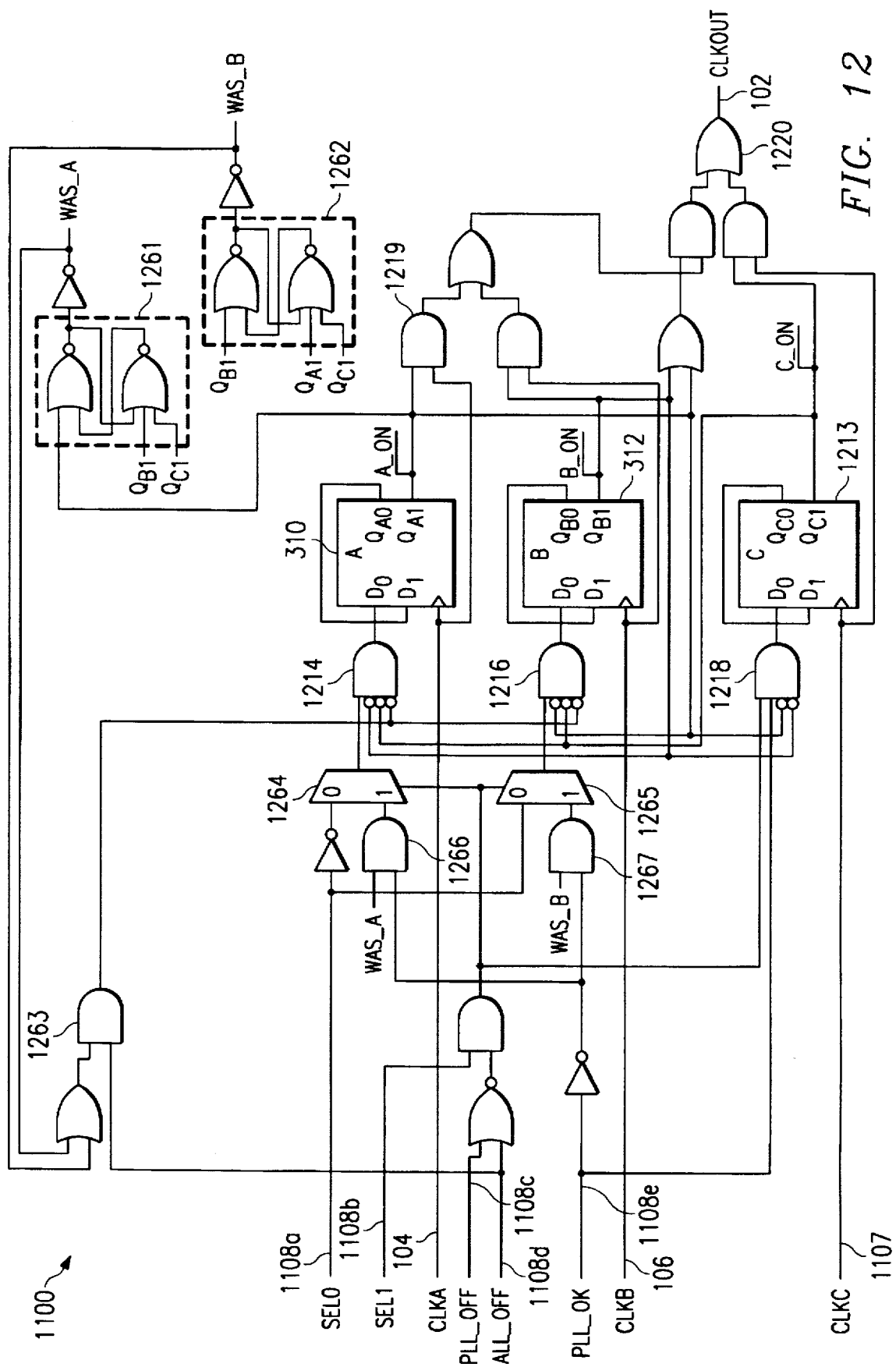
FIG. 12 is a circuit diagram of the triple throw interlocked clock multiplexer of FIG. 11.

FIG. 12 is a circuit diagram of the triple throw interlocked clock multiplexer of FIG. 11, according to the present invention. ICM 1100 is another embodiment of an interlocked clock multiplexer which is similar to ICM 100, but switches between three clock source signals CLKA 104, CLKB 106 and CLKC 1107 in response to select signals SEL0 1108a and SEL1 1108b to acquire a clean, glitch free output clock signal 102 which has selected clock characteristics. In this implementation, CLKC is typically generated by PLL 1120. The PLL may also provide a "PLL_OK" signal 1108e which indicates that the PLL has locked and is generating a good CLKC signal.

ICM 1100 is controlled by control signals SEL0 and SEL1, whose truth table is listed in Table 3.

TABLE 3

| SEL1 | SEL0 | CLKOUT |
| --- | --- | --- |
| 0 | 0 | CLKA |
| 0 | 1 | CLKB |
| 1 | x | CLKC |

The circuitry of ICM 1100 is designed so that no more than one clock source can be selected at a time. The CLKA synchronizer 310, CLKB synchronizer 312 and CLKC synchronizer 1213 are interlocked to form a cross-coupled switch. If CLKA is selected CLKB or CLKC can not be selected until CLKA is deselected. The same holds true for other combinations of CLKA, CLKB, & CLKC. The 2-stage synchronizer for each clock source ensures that there will be no glitches during a switch by creating a wait state which is approximately two cycles after "breaking" a prior selection and before "making" a new selection, as described with reference to FIGS. 4 and 5.

In this embodiment, there are 2 low-power modes available. One mode allows only CLKC to be shut down. The other mode allows all clocks to be disabled. These modes are controlled by PLL_OFF signal 1108c, ALL_OFF signal 1108d, and PLL_OK signal 1108e. PLL_OFF signal PLL_OFF and all_clocks_off signal ALL_OFF may be formed by circuitry such as illustrated in FIGS. 8 or 10 using a control register such as control register 730 or 930. Once a low power mode is specified by setting a control register, a low power mode is generally not entered until processor 1170 executes an IDLE instruction or writes a bit to a control register to indicate that a low power mode is to be entered. After an all-off low power mode is entered, oscillator enable signal 751 is de-asserted until a wakeup event occurs.

If CLKC is selected (SEL1==1) and PLL_OFF goes HIGH (asserted), clock output signal 102 is switched from CLKC to CLKA or CLKB, depending on the value of SEL0, after appropriate synchronization as described previously according to the present invention. PLL 1120 can then be disabled. When PLL_OFF is de-asserted again, lockout signal 102 will continue to be supplied by CLKA/CLKB until PLL_OK goes HIGH, indicating that CLKC is stable. At this time, CLKC will be acquired by ICM 1100 to form clock out signal 102 after appropriate synchronization.

If ALL_OFF is asserted and CLKA or CLKB is currently selected, all clocks will be deselected and CLKOUT will go LOW after appropriate synchronization. At this time, all clock sources can then be shut off. When ALL_OFF is de-asserted again, either CLKA or CLKB will be selected, depending on the value of SEL0, after appropriate synchronization.

Another aspect of the present invention is that when ALL_OFF is asserted and CLKC is currently selected, CLKOUT will be switched from CLKC to CLKA or CLKB, depending on the value of SEL0, as described above. Once CLKOUT has been switched to CLKA or CLKB, the current state will be captured by the RS latches 1261 or 1262 (WAS_A or WAS_B) and then all clocks will be deselected and CLKOUT will go LOW after synchronization. When ALL_OFF is de-asserted again, CLKA or CLKB will be selected depending on the values latched in RS latches 1261-1262. CLKOUT will continue to be supplied by CLKA/CLKB until PLL_OK goes HIGH indicating CLKC is stable. Then CLKOUT will be switched back to CLKC after synchronization. An advantage of this clock switching sequence is that processor 1170 can quickly begin operation after a wakeup event using CLKA or CLKB, and then automatically switch to CLKC when PLL 1120 is stable.

Note that in some systems, it may be necessary to gate the ALL_OFF signal with a B_OK or an A_OK signal to avoid re-selecting a clock source before it is stable.

Figure 13:
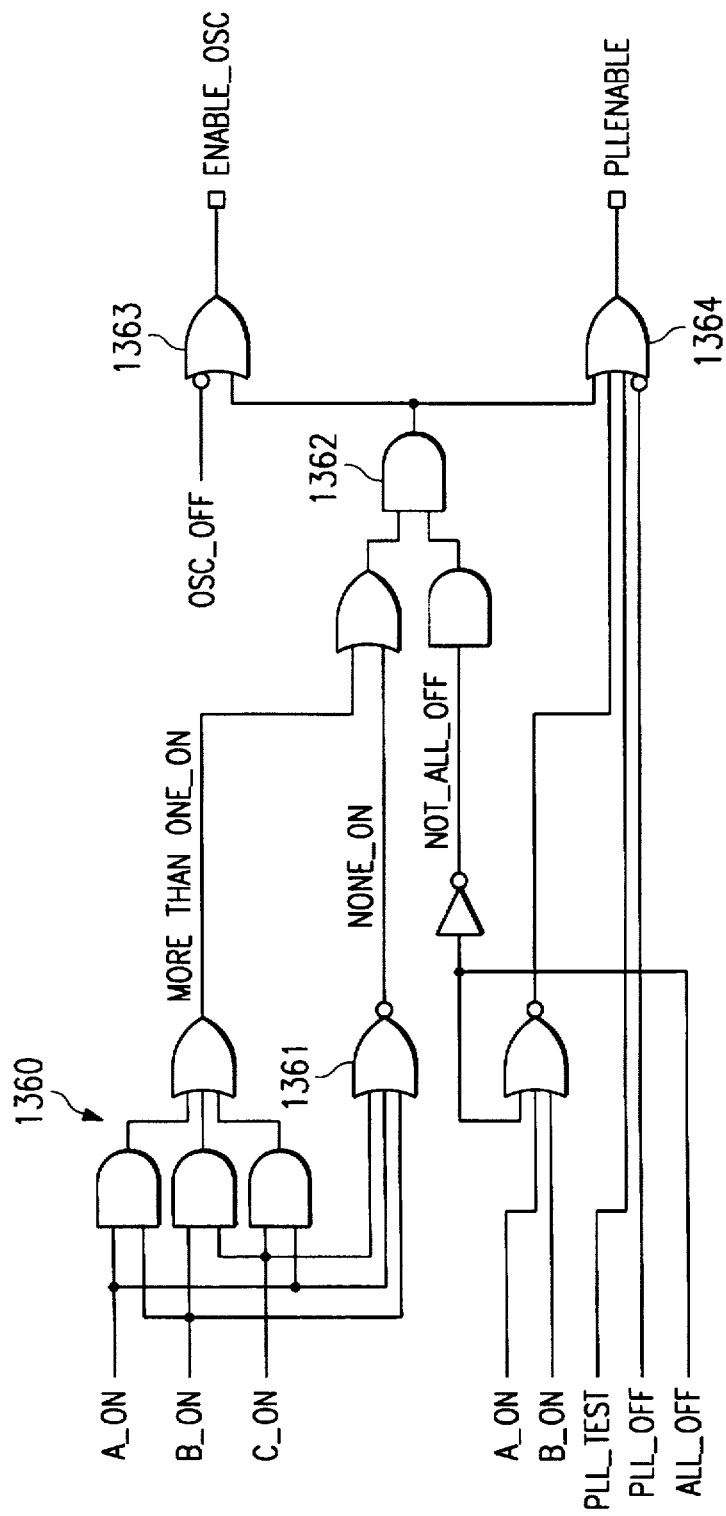
FIG. 13 is a circuit diagram of an optional circuit which may be connected to the interlocked clock multiplexer of FIGS. 3 or 12 for forcing at least one clock source to be active after power is restored.

Another aspect of the present invention is illustrated in FIG. 13, which is a circuit diagram of an optional circuit which may be connected to the interlocked clock multiplexer of FIGS. 3 or 12 for forcing at least one clock source to be active after power is restored. Under some circumstances, one or more synchronizers 310, 312, or 1213 may be set into an anomalous state during application of power to the clock acquisition subsystem. The circuit of FIG. 13 detects if more than one clock is selected with gate 1360 and detects if no clocks are selected with gate 1361. If signal ALL_OFF is not asserted, then gate 1362 will enable gate 1363 to form an enable oscillator signal regardless of the state of signal OSC_OFF and will enable gate 1364 to form a PLL enable signal. By turning on the oscillator and PLL, clock signals will be applied to synchronizers 310, 312, and 1213 which will cause an anomalous state to be eliminated.

The novel circuits of the present invention have many advantageous uses in data processing systems. Any one of a large number of clock sources can be selected to optimize the speed of processing for a specific situation, and then be changed to a different clock source for a different optimization under control of a program operating in the data processing system.

Another advantage is that various clock switching sequences can be performed when entering and leaving a low power mode either automatically or under software control.

Embodiments of the present invention have been described which have a double throw ICM for selecting between two clock source signals and a triple throw ICM for selecting from three clock source signals, where each clock source signal may be derived from a number of clock sources. Other embodiments may be constructed in a similar manner having an ICM with more than three clock signal inputs.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. An electronic data processing system, comprising a clock acquisition system for providing an output clock which is selectable from a plurality of clock sources, said clock acquisition system further comprising:

a plurality of clock sources;

a selection means for specifying a selected clock source from said plurality of clock sources;

an interlocked clock multiplexer having a plurality of clock source input terminals with a different one of said plurality of clock sources connected to each of said plurality of clock source input terminals, said interlocked clock multiplexer being responsive to said selection means, said interlocked clock multiplexer being operational to insert a wait state of a predetermined logic value on an output clock terminal at the end of a complete clock cycle on said output terminal corresponding to a previously selected clock source from any of said plurality of clock source input terminals before beginning a complete clock cycle of a newly selected clock source from any other of said plurality of clock source input terminals; and wherein said wait state is inserted for a period of time which is greater than at least one cycle of said newly selected clock source and less than or equal to approximately a maximum time to synchronize said newly selected clock source.

2. The electronic data processing system of claim 1, wherein said maximum time to synchronize is less than or equal to approximately two cycles of said newly selected clock source.

3. The electronic data processing system of claim 1, wherein said interlocked clock multiplexer further comprises:

a first clock source input terminal connected to a first clock source synchronizer, said first synchronizer having a first delay time;

a second clock source input terminal connected to a second clock source synchronizer, said second synchronizer having a second delay time;

a select terminal for receiving a select signal from said selection means;

a first interlock circuit having an output connected to said first synchronizer and a first input connected to said select terminal and a second input connected to said second synchronizer, said first interlock circuit being operational to provide an asserted signal to said first clock synchronizer only when said select signal is in a first predetermined select state and said second synchronizer is not asserted;

a second interlock circuit having an output connected to said second synchronizer and a first input connected to said select terminal and a second input connected to said first synchronizer, said second interlock circuit being operational to provide an asserted signal to said second clock synchronizer only when said select signal is in a second predetermined select state and said first synchronizer is not asserted; and an output circuit for forming said output clock signal on said output clock terminal connected to said first and second clock source terminals and to said first and second synchronizers, said output circuit operational to form said output signal corresponding to a signal on said first clock source terminal only when said first synchronizer is asserted, to form said output signal corresponding to a signal on said second clock source terminal only when said second synchronizer is asserted, and to form said wait state when neither said first synchronizer or said second synchronizer are asserted.

4. The electronic data processing system of claim 3, further comprising:
at least a third clock source input terminal connected to a third clock source synchronizer, said third synchronizer having a third delay time; and
said output circuit is connected to at least said third clock source terminal and to at least said third synchronizer, wherein said wait state is formed when none of said synchronizers are asserted.

5. The electronic data processing system of claim 3, further comprising a detection circuit connected to said first and said second synchronizers for detecting if more than one of said plurality of clock sources is selected and for detecting if none of said plurality of clock sources is selected.

6. The electronic data processing system of claim 1, wherein said selection means comprises a selection circuit which is controlled by a programmable device.

7. The electronic data processing system of claim 1, wherein said selection means comprises a selection circuit which is controlled by manual means.

8. The electronic data processing system of claim 1, wherein said selection means comprises a circuit which is responsive to an OK signal from one of said plurality of clock sources so as to select said clock source only when said OK signal is asserted.

9. The electronic data processing system of claim 1, further comprising a processing device which is connected to said output clock terminal, wherein said processing device has a processing circuit which is responsive to said output clock signal.

10. The electronic data processing system of claim 8, wherein said clock acquisition system and said processing device are formed on a single semiconductor substrate.

11. A method for providing a clock signal which has selectable clock characteristics to a processing device, comprising the steps of:
providing a plurality of clock sources, each of said clock sources having at least one of a plurality of clock characteristics;
selecting a first clock source having a first clock characteristic from said plurality of clock sources by establishing a first clock select state;
connecting said first clock source to an output clock terminal to provide said clock signal to said processing device, wherein said first clock source is selected in response to said first select state; and
switching cleanly to a second clock source having a second clock characteristic from said plurality of clock sources, wherein said step of switching cleanly comprises:
selecting said second clock source by establishing a second clock select state;
disconnecting said first clock source from said output terminal after a first synchronization delay while said clock signal is in a first logic state, wherein said first synchronization delay is synchronized by said first clock source, wherein said first synchronization delay is greater than approximately one period of said first clock source;
maintaining said clock signal in said first logic state for a second synchronization period, wherein said second synchronization delay is synchronized by said second clock source and wherein said second synchronization delay is greater than approximately one period of said second clock source; and
connecting said second clock source to said output clock terminal at the end of said second synchronization delay so that a first clock pulse corresponding to said second clock source is provided which conforms to said second clock characteristic, whereby no glitches or runt pulses are provided on said output clock terminal.

12. The method of claim 10, wherein the step of selecting said second clock source is responsive to a signal from said second clock source.

13. A method for providing a clock signal which has selectable clock characteristics to a processing device, comprising the steps of:
providing a plurality of clock sources, each of said clock sources having at least one of a plurality of clock characteristics;
selecting a first clock source having a first clock characteristic from said plurality of clock sources by establishing a first clock select state,
wherein said first clock source is a phase locked loop;
connecting said first clock source to an output clock terminal to provide said clock signal to said processing device, wherein said first clock source is selected in response to said first select state;
switching cleanly to a second clock source having a second clock characteristic from said plurality of clock sources;
changing a control parameter for said first clock source which causes said first clock characteristic to change to an altered first clock characteristic;
waiting for said first clock source to stabilize while said processing device continues to operate using said second clock source; and
switching cleanly to said first clock source after said first clock source has stabilized, and
wherein said step of switching cleanly comprises:
selecting said second clock source by establishing a second clock select state;
disconnecting said first clock source from said output terminal after a first synchronization delay while said clock signal is in a first logic state, wherein said first synchronization delay is synchronization by said first clock source;
maintaining said clock signal in said first logic state for a second synchronization period, wherein said second synchronization delay is synchronized by said second clock source; and
connecting said second clock source to said output clock terminal at the end of said second synchronization delay so that a first clock pulse corresponding to said second clock source is provided which conforms to said second clock characteristic, whereby no glitches or runt pulses are provided on said output clock terminal.

14. The method of claim 12, wherein if said control parameter for said first clock source is changed while said first clock source is selected, said control parameter will not become effective until said second clock source is selected.

* * * * *

UNITED STATES PATENT AND TRADEMARK OFFICE
CERTIFICATE OF CORRECTION

PATENT NO. : 5,790,609
DATED : August 4, 1998
INVENTOR(S) : Swoboda

It is certified that error appears in the above-identified patent and that said Letters Patent is hereby corrected as shown below:

On the title page, under item [56], add the following references

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 8 | 5 | 3 | 6 | 5 | 3 | 8/1/89 | Maher | | | |
| | | 5 | 2 | 8 | 9 | 0 | 5 | 0 | 2/22/94 | Ogasawara | | | |
| | | 5 | 5 | 5 | 0 | 4 | 8 | 9 | 8/27/96 | Raab | | | |
| | | 5 | 1 | 3 | 6 | 1 | 8 | 0 | 8/4/92 | Caviasca et al. | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 3 | 5 | 9 | 2 | 3 | 3 | 9/13/89 | EU | | | | |
| | | | | | | | | | | | | | | |

Signed and Sealed this

Second Day of March, 1999

Attest:

Q. TODD DICKINSON

*Attesting Officer*    *Acting Commissioner of Patents and Trademarks*